United States Patent [19]

Randen

[11] Patent Number: 5,652,296
[45] Date of Patent: Jul. 29, 1997

[54] WATER-BASED ADHESIVES

[75] Inventor: Neil A. Randen, Marine on St. Croix, Minn.

[73] Assignee: Minnesota Mining and Manufacturing Company, St. Paul, Minn.

[21] Appl. No.: 617,533

[22] Filed: Mar. 15, 1996

Related U.S. Application Data

[63] Continuation of Ser. No. 293,225, Aug. 19, 1994, abandoned.

[51] Int. Cl.$^6$ .................................................. C08L 41/00
[52] U.S. Cl. .................. 524/547; 524/551; 524/555; 526/240; 526/292.2; 526/292.95; 526/304; 526/307
[58] Field of Search ...................... 524/547, 555, 524/551, 812, 815; 526/240, 292.2, 292.95, 304, 307

[56] References Cited

U.S. PATENT DOCUMENTS

| | | | |
|---|---|---|---|
| 2,671,065 | 3/1954 | Ulrich | 260/29.6 |
| 2,744,130 | 5/1956 | Winberg | 260/482 |
| 2,777,872 | 1/1957 | Shacklett | 260/482 |
| 3,634,366 | 1/1972 | Chujo et al. | 260/78.5 |
| 3,689,470 | 9/1972 | Shachat et al. | 260/86.1 |
| 3,790,533 | 2/1974 | Samour | 260/78.5 R |
| 3,836,537 | 9/1974 | Boerwinkle et al. | 260/29.6 HN |
| 3,927,199 | 12/1975 | Micchelli et al. | 424/47 |
| 4,115,339 | 9/1978 | Restaino | 524/815 X |
| 4,116,698 | 9/1978 | Machida et al. | 106/2 |
| 4,130,524 | 12/1978 | Boerwinkle et al. | 260/29.6 HN |
| 4,131,583 | 12/1978 | Boerwinkle | 260/29.6 HN |
| 4,224,150 | 9/1980 | Buriks et al. | 524/815 X |
| 4,315,910 | 2/1982 | Nowak, Jr. et al. | 424/47 |
| 4,442,248 | 4/1984 | Kanda et al. | 523/414 |
| 4,536,445 | 8/1985 | Toy | 428/349 |
| 4,558,741 | 12/1985 | Borchardt et al. | 166/275 |
| 4,581,402 | 4/1986 | Dunk et al. | 524/555 X |
| 4,693,839 | 9/1987 | Kuwamoto et al. | 252/51.5 A |
| 4,735,989 | 4/1988 | Guioth et al. | 524/555 X |
| 4,814,101 | 3/1989 | Schieferstein et al. | 252/174.23 |
| 4,921,902 | 5/1990 | Evani et al. | 524/555 |
| 4,994,088 | 2/1991 | Ando et al. | 8/426 |
| 4,996,045 | 2/1991 | Leighton et al. | 424/70 |
| 4,997,895 | 3/1991 | Ohmae et al. | 524/815 X |
| 5,045,617 | 9/1991 | Shih et al. | 526/264 |
| 5,110,864 | 5/1992 | Robinson et al. | 524/815 X |
| 5,135,840 | 8/1992 | Reuter et al. | 430/449 |
| 5,171,781 | 12/1992 | Farrar et al. | 524/555 X |
| 5,178,961 | 1/1993 | Faust et al. | 428/463 |
| 5,403,883 | 4/1995 | Hessner et al. | 524/815 X |

FOREIGN PATENT DOCUMENTS

| | | |
|---|---|---|
| 0 256 312 A2 | 2/1988 | European Pat. Off. |
| 0 311 904 A1 | 4/1989 | European Pat. Off. |
| 0 354 364 A1 | 2/1990 | European Pat. Off. |
| 2 182 170 | 12/1973 | France |
| 3130992 | 2/1983 | Germany ........ 524/812 |
| 0029806 | 2/1983 | Japan ............. 524/812 |

OTHER PUBLICATIONS

C. Meuleman, "Scotch Water Base 3035", Jun. 1993.
Lichman, "Handbook of Adhesives" *Water–Based and Solvent–Based Adhesives* 2nd Ed., pp. 679–691 (1977).

*Primary Examiner*—Judy M. Reddick
*Attorney, Agent, or Firm*—Gary L. Griswold; Walter N. Kirn; Carolyn V. Peters

[57] ABSTRACT

A water-based adhesive comprising water-soluble polymers having carboxy groups and quaternary ammonium groups wherein the polymers can be derived by copolymerizing one or more unsaturated aliphatic carboxylic acid monomers, such as acrylic acid and/or methacrylic acid, and alkylaminoalkyl(meth)acrylate or alkylaminoalkyl(meth)acrylamide, such as dimethylaminoethyl methacrylate or dimethylaminopropylmethacrylamide and the water-based adhesive is a viscous liquid that is colorless, relatively odorless, and free of organic solvents.

12 Claims, No Drawings

WATER-BASED ADHESIVES

This is a continuation of application Ser. No. 08/293,255 filed Aug. 19, 1994 now abandoned.

This invention relates to water-based adhesives made from synthetic polymers and to the preparation, packaging, and use of such adhesives. In another aspect, it relates to synthetic polymers having carboxy groups and quaternary ammonium groups and the use of such polymers in making water-based adhesives.

Multipurpose adhesives currently being sold today are typically solvent-based and they generally provide stronger bonds than known water-based adhesives. There still are, however, numerous problems that have long been recognized with solvent-based adhesives, such as the flammability and toxicity associated with organic solvents ¾ see Skeist, I. "Handbook of Adhesives," Van Nostrand Reinhold Co., New York, Chapter 44 (1977). The organic solvents impart to the adhesives an objectionable odor and such adhesives often are recommended to be used in well-ventilated areas because of the volatile nature of the solvents and they sometimes are misused by children for "glue-sniffing." Thus, the safety and environmental concerns about the manufacture and use of solvent-based products have lead to laws and regulations proposed by government regulatory agencies or bodies.

Various synthetic polymers have been used or proposed for use in water- and solvent-based adhesives, including polyacrylates and polymethacrylates ¾ see "Handbook of Adhesives," supra. In the patent literature, U.S. Pat. No. 3,634,366 (Chujo et al.) describes making a polymer said to be useful, inter alia, as "adhesive," by polymerizing an unsaturated aliphatic monobasic or dibasic acid, for example, acrylic acid and methacrylic acid, with an unsaturated monomer having a tertiary amine group, such as dimethylaminoethyl methacrylate. U.S. Pat. No. 3,790,533 (Samour) describes pressure-sensitive adhesive polymers (and certain organic solvent solutions thereof) of certain carboxylic acid vinyl monomers, for example, acrylic acid and methacrylic acid, an aminoalkyl acrylate, for example, dimethylaminoethyl methacrylate, and an alkyl acrylate (in the amount from 65 to 99.6% by weight of the total monomers), for example, ethyl acrylate.

It is also known that relatively low concentrations of zwitterionic polymers, or other polymers derived from basic vinyl monomers such as dimethylaminoethyl methacrylate, can be used in water-containing hair treatment preparations or personal care products ¾ see U.S. Pat. No. 3,836,537 (Boerwinkle et al.), U.S. Pat. No. 3,927,199 (Miccbelli et al.), U.S. Pat. No. 4,315,910 (Nowak, Jr. et al.), U.S. Pat. No. 4,814,101 (Schieferstein et al.), U.S. Pat. No. 4,994,088 (Ando et al.), and U.S. Pat. No. 5,045,617 (Shih et al.)

Other uses of certain carboxy- and amino-containing polymers in aqueous coating compositions described in U.S. Pat. No. 4,131,583 (Boerwinkel) and U.S. Pat. No. 4,442,248 (Kanda et al.). U.S. Pat. No. 4,558,741 (Borchardt et al.) describes a method of preventing or reducing the ill effects of migrating fines, e.g., silica fines, in an earthen formation or well-bore by contacting the fines with a certain carboxy- and amino-containing polymer which can be dispersed in the amount of 0.01 to 5% in a carrier fluid, such as a saline solution.

This invention provides, in one aspect, a water-based adhesive comprising water-soluble polymer having carboxy groups and quaternary ammonium groups. The polymer can be derived by copolymerizing (or interpolymerizing) one or more unsaturated aliphatic carboxylic acid monomers, for example, acrylic acid and/or methacrylic acid, and alkylaminoalkyl(meth)acrylate or alkylaminoalkyl(meth)acrylamide, for example, dimethylaminoethyl methacrylate or dimethylaminopropylmethacrylamide.

The water-based adhesive is a viscous liquid that can be made water-clear, colorless, and relatively odorless or free of objectionable odor. It can be made free of organic solvents and thus superior in safety and environmental aspects as compared to solvent-based adhesives, which generally are opaque or lack clarity and often are not colorless. The adhesive can be made at relatively low cost, packaged in metal or plastic tubes, can sustain freeze-thaw conditions as well as hot temperature without substantial effect on its stability, and it disperses readily from the tube, without running, to easily form a desired thin film or layer on the substrate to be bonded without discoloring the substrate. The adhesive can be used for a host of bonding purposes, such as for bonding paper, cardboard, photographs, wood, fabric, and other water-permeable or porous substrates. It dries readily in air at room temperature and in dried form is clear and water-washable. The bonding strength is surprisingly high and satisfies the holding strength required of a multipurpose household, school, or office adhesive.

The polymers, some of which are novel that are used in the water-based adhesives of this invention are, unless they are exposed to elevated temperatures, which renders them insoluble, soluble in water even after the adhesives are applied and dried. The polymers can be made in different ionic forms, namely zwitterionic (or dipolar), amphoteric, and in a form (believed novel) having both zwitterionic and amphoteric properties. A broad class of the polymers can be represented the generic structural formula (I).

(Formula 1)

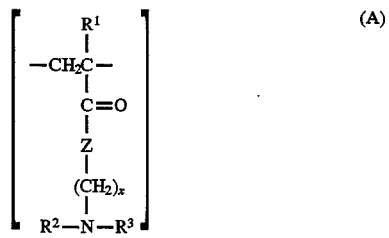

(A)

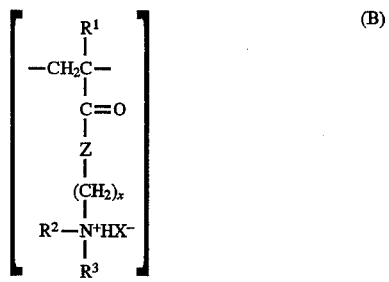

(B)

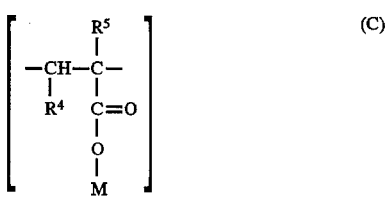

(C)

-continued
(Formula 1)

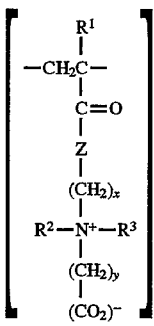

where the bracketed structures A, B, C, and D are interpolymerized units randomly repeated and covalently bonded together in polymer chains, units A and C always being present and units B and D independently being present or absent; each $R^1$ is independently a hydrogen atom or lower alkyl group, such as a methyl or ethyl group; $R^2$ and $R^3$ are each independently a $C_1$ to $C_4$ alkyl group, such as methyl and ethyl; each $R^4$ is independently a hydrogen atom, a methyl group, or COOM; each $R^5$ is independently a hydrogen atom, a lower alkyl group such as a methyl or ethyl group, or $CH_2COOM$, at least one of $R^4$ and $R^5$ is a hydrogen atom; X is the anion of an organic acid or mineral acid, such as a chloride, sulfate, and acetate; M is a hydrogen atom or an alkali metal atom, such as sodium or potassium; Z is O or NH; and subscripts x and y are independently integers of 1 to 3. The repeating units are derived from monomers used to make the polymers. Alternatively, units D can be derived from some of units A and C via known Michael addition reactions when acrylic acid is used as a monomer precursor of units C.

The above formula is applicable for polymers having different ionic forms, for example (1) when units D are present and $R^4$ and $R^5$ are hydrogen, the resulting polymer is zwitterionic in nature (2) when units D are absent and one of $R^4$ and $R^5$ is hydrogen, the resulting polymer is amphoteric in nature and (3) when all unites D are present and in some units C both $R^4$ and $R^5$ are hydrogen and some other of units C one of $R^4$ and $R^5$ is hydrogen, the resulting polymer are zwitterionic and amphoteric in nature.

Polymers used in this invention can be made by known polymerization techniques such as free-radical polymerization in aqueous solution, for example, at 20° to 100° C., using a radical polymerization initiator, such as ammonium persulfate. Polymers prepared in aqueous medium (e.g., at 20 to 55% solids) provide an aqueous solution of medium viscosity that enable the adhesives to be packaged, dispensed, and applied in a ready, satisfactory, clean manner.

A subclass of the polymers used in this invention are zwitterionic in nature. They can be made in aqueous medium by reacting in a polymerization reactor acrylic acid (AA) and one or more dialkylaminoalkyl(meth)acrylates or (meth)acrylamides to form an ionic or zwitterionic (or dipolar) monomer. Basic (or amino) monomers which can be used are N,N-dimethylaminoethyl methacrylate (DMAEMA), N,N-dimethylaminoethyl acrylate (DMAEA), N,N-diethylaminoethyl methacrylate (DEAEMA), N,N-diethylaminoethyl acrylate (DEAEA), N,N-dimethylaminopropyl methacrylate (DMAPMA), N,N-dimethylaminoethyl methacrylamide (DMAEMAm), N,N-dimethylaminoethyl acrylamide (DMAEAm), N,N-dimethylaminopropyl methacrylamide (DMAPMAm) and the like. The basic monomers undergo a Michael addition reaction with the AA to form a third monomer, a Zwitterionic monomer, in situ, which is a beta, beta-dialkyl beta-(meth)acryloxy or amidylalkylaminopropionate betaine or, for example, beta, beta-dimethyl beta-methacryloxyethylaminopropionate betaine when DMAEMA is used. In addition, small amounts of other monomers such as N-2'-methacryloxyethyl)-N,N,N-trimethylammonium chloride, N-vinyl-2-pyrollidone, vinyl acetate and the like and other additives such as hydrochloric acid (HCl) may be included herein. The reaction is a reversible Michael addition reaction, with the acidic and basic monomers in equilibrium with the zwitterionic compound or monomer. This equilibrium reaction mixture can then be mixed with a free-radical generator (catalyst) and heated to initiate polymerization. Scheme I illustrates this preparation of the zwitterionic polymer.

Scheme I $CH_2=C(CH_3)C(O)Z(CH_2)_2N(CH_3)_2 + CH_2=CHCO_2H + HCl$

$CH_2=C(CH_3)C(O)Z(CH_2)_2N(CH_3)_2 + CH_2=C(CH_3)C(O)Z(CH_2)_2N^+(CH_3)_2HCl^-$
$+ CH_2=CHCO_2H + CH_2=C(CH_3)C(O)Z(CH_2)_2N^+(CH_3)_2CH_2CH_2CO_2^-$

I

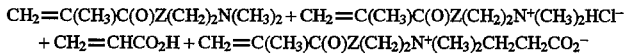

-continued
Scheme I

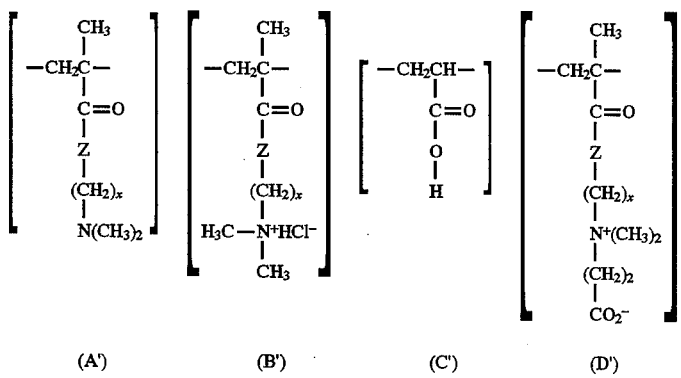

(A')  (B')  (C')  (D')

The second subclass of polymers that can be used in making the water-based adhesives of this invention are amphoteric in nature and they can be made from basic monomers like those of Scheme I and those acidic monomers that do not undergo a Michael addition reaction, such as methacrylic acid (MAA), maleic acid, itaconic acid, and crotonic acid, and the like. As above, HCl and small amounts of other monomers can be included. Scheme II illustrates this preparation of the amphoteric polymer, in which the acidic monomer is copolymerized with an alkylaminoalkylmethacrylate or (meth)acrylamide.

Scheme II

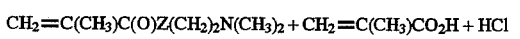

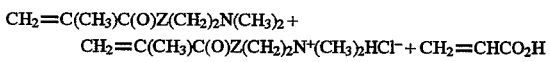

-continued
Scheme II

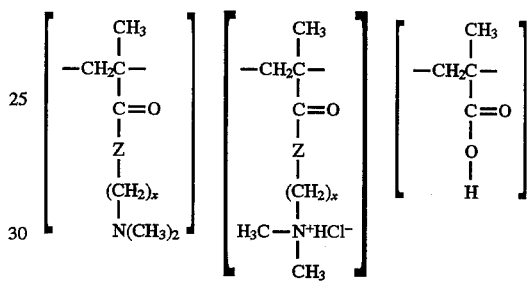

(A''')  (B''')  (C''')

The third, and preferred, subclass of the polymers that can be used in the water-based adhesives of this invention are zwitterionic and amphoteric in nature. Such polymers can be prepared from basic monomers like those used in Scheme II and a combination of two types of acidic monomers, one type of which will undergo a Michael addition reaction. The combination of acidic monomers is used together with one or more basic monomers or alkylamino(meth)acrylates or (meth)acrylamides. As above in reference to the first subclass of polymers, HCl or other acids and small amounts of other monomers can be used in the preparation of the polymer. Scheme III illustrates this preparation of the zwitterionic-amphoteric polymer.

Scheme III

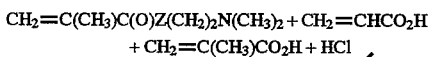

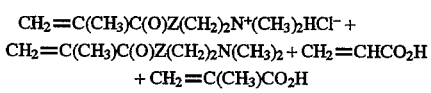

-continued
Scheme III

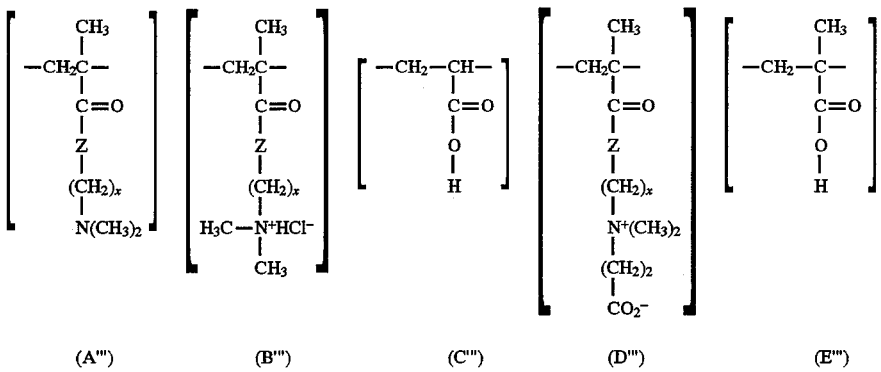

(A''')    (B''')    (C''')    (D''')    (E''')

In preparing polymers II and III of Schemes I and II, the amounts of the initial dialkylaminoalkyl(meth)acrylate or (meth)acrylamide monomers used can be 40 to 60 mol percent, respectively, the amount of the acrylic or methacrylic acid used can be 60 to 40 mol %, and the amount of HCl or other acids used can be 0 to 10 mol %, the latter amount being based on the total mols of initial monomers used. In preparing polymer IV of Scheme III, the amount of the acrylate or acrylamide used is 40 to 60 mol %, the amounts of acrylic and methacrylic acid can be 5 to 55 mol %, and the amount of HCl or other acid used can again be 0 to 10 mol %, based on the total mols of initial monomers used.

EXAMPLES

Objects and advantages of this invention are illustrated in the following examples.

Polymers useful in the adhesives of this invention were prepared by the following procedure.

De-ionized water (D.I. water) was charged to a 1-liter resin kettle equipped with a mechanical stirrer, thermometer, an IR[2] Therm-O-Watch, a nitrogen inlet, and a reflux condenser. Water, acidic monomers, and HCl if used, were added and the solution heated to 55° C. At 55° C. the basic monomer(s) was added. An acid/base neutralization reaction occurred and the reaction temperature rose to about 65° C. Then the polymerization mixture was heated to the initiation temperature. About 20 minutes after the addition of the basic monomer(s) and at the initiation temperature, the catalyst, pre-dissolved in water, was added. A slow nitrogen purge was started at this time in preparing most of the polymers and started earlier in the preparation of some of the other polymers and to reduce coloring of the polymer solution during the ensuing exothermic polymerization. The reaction temperature peaked between 88° and 98° C. within 5–15 minutes and would slowly cool and be maintained at the initiation temperature for a total polymerization time of 2 hours. The polymer was removed from the reactor and the amount of non-volatile polymer solids and Brookfield viscosities determined. The polymers were colorless. Specific preparation for each polymer type is described below and Table I shows formulations and reaction parameters for other examples of three polymer types, where "Z" denotes a zwitterionic polymer (illustrated by formula II, supra), "A" denotes an amphoteric polymer (illustrated by formula III, supra), and "Z/A" denotes a zwitterionic-amphoteric polymer (illustrated by formula IV, supra).

Illustrating the preparation of a preferred zwitterionic polymer, Ex. 4/Z, a 53:47:4 mole ratio DMAEMA:AA:HCl zwitterionic polymer, D.I. water, 198.7 g, was charged to a 1 liter resin kettle equipped as above. A fast nitrogen purge was used to clear the reactor of air, then a slow purge was maintained throughout the polymerization. Acrylic acid, 25.7 g, and 2.9 g of conc. HCl were added next. The reaction mixture was heated to 55° C. and then 63.2 g of DMAEMA added. The reaction mixture exothermed to 66.5° C. and then it was heated to 75° C. About 20 minutes after the addition of the DMAEMA, 0.5400 g of ammonium persulfate, pre-dissolved in 9.0 g of D.I. water, was added. The reaction exothermed rapidly to 89° C. The polymerization mixture was allowed to cool back down to 75° C. and maintained there for a total polymerization time of 2 hours. The polymer was removed from the reactor and was water-clear, colorless, and had a Brookfield viscosity of 54,100 cps.

The preparation of a preferred amphoteric polymer, a 51:49:2 mole ratio DMAEMA:MAA:HCl, Ex. 14/A, was as follows. D.I. water, 263.8 g, was charged to a 1-liter resin kettle equipped as above. Methacrylic acid, 41.1 g, and 1.9 g of conc. HCl were added next. A slow nitrogen purge was started to clear the reactor of air and then maintained throughout the polymerization. The reaction mixture was heated to 55° C. and 78.2 g of DMAEMA was added. The reaction mixture exothermed to about 65° C. and then was heated to 80° C. Twenty minutes after the addition of the DMAEMA, 0.7200 g of potassium persulfate, pre-dissolved in 15.0 g. distilled water, was added. The reaction exothermed rapidly to 89.7° C., cooled back down to 80° C. and was maintained at 80° C. for a total polymerization time of 2 hours. The polymer was removed from the reactor. It was water-clear and colorless and had a 32,000 cps Brookfield viscosity of 32,000 cps.

The preparation of a preferred zwitterionic/amphoteric polymer, Ex. 24Z/A, a 51:24.5:24.5:2 mole ratio DMAEMA:MAA:AA:HCl, was as follows. D.I. water, 228.6 g, was charged to a 1 liter resin kettle equipped as above. Methacrylic acid, 24.7 g, 20.7 g of acrylic acid and 2.3 g of conc. HCl were added next. The reaction mixture was heated to 55° C. and 93.9 g of DMAEMA was added. The reaction mixture exothermed to 68° C. and then was heated to 80° C. About 20 minutes after the addition of the DMAEMA, 0.700 g of potassium persulfate, pre-dissolved in 30.0 g of water, was added and a slow nitrogen purge was started. The reaction exothermed rapidly to 91° C., cooled back down to 80° C. and was maintained at 80° C. for a total polymerization time of 2 hours. The polymer was removed from the reactor. It was water-clear and colorless and had a Brookfield viscosity of 37,800 cps.

The preparation of another preferred zwitterionic/amphoteric polymer, Ex. 34Z/a, a 50.3:25.1:24.6:2.5 mole ratio DMAEMA:MAA:AA:HCl polymer, was as follows. D.I. water, 308.0 g, was charged to a 1 liter resin kettle equipped as above; 27.2 grams of methacrylic acid, 22.3 g of acrylic acid and 3.1 g of conc. HCl were added next. The reaction mixture was heated to 65.0° C. and 99.4 g of DMAEMA was added. The reaction mixture exothermed to 76.5° C. and was maintained at 77.0° C. About 20 minutes after the addition of the DMAEMA, 0.3380 g of potassium persulfate, pre-dissolved in 40.0 g of D.I. water, was added and a slow nitrogen purge started. The reaction exothermed rapidly to 90.0° C. and then cooled back down to 77.0° C. The polymerization mixture was maintained at 77.0° C. for a total time of 2 hours. The polymer was removed from the reactor. It was water-clear and colorless and had a 106,200 cps Brookfield viscosity at 30% solids.

The preparation of a representative zwitterionic polymer (a 53:47:4 mole ratio DMAPMAm:AA:HCl, Ex 35/Z) utilizing N,N-dimethylaminopropyl methacrylamide, DMAPMAm, is as follows. D.I. water, 159.6, was charged to a 1 liter resin kettle equipped as above. Acrylic acid, 34.5 g, and 3.9 g of conc. HCl were added next. The reaction mixture was heated to 55.0° C. and then 92.0 g of DMAPMAm added. The reaction mixture exothermed to about 67° C. and then heated to 75.0° C. About 20 minutes after the addition of the DMAPMAm, 0.7680 g of potassium persulfate, pre-dissolved in 30.0 g of D.I. water, was added. A slow nitrogen purge was started. The reaction exothermed to 86.3° C. in approximately 6 minutes and was allowed to cool back down and maintained at 75.0° C. Two hours after the first initiator charge, 0.0768 g of potassium persulfate was added and the polymerization continued for another hour. The polymer was cooled and removed from the reactor. It was water-clear with a very slightly yellow color and had a 17,440 cps Brookfield viscosity.

The preparation of a representative amphoteric polymer (a 51:49:2 mole ratio DMAPMAm:MAA:HCl, Ex 36A) utilizing an acrylamide monomer, is as follows. D.I. water, 191.4 g, was charged to a 1 liter resin kettle equipped as above. Methacrylic acid, 39.0 g, and 1.8 g of conc. HCl were added next. The reaction mixture was heated to 55.0° C. and 80.3 g of DMAPMAm was added. The reaction mixture exothermed to 67.5° C. and then was heated to 80.0° C. About 20 minutes after the addition of the DMAPMAm, 0.7200 g of potassium persulfate, pre-dissolved in 30.0 g of D.I. water, was added. A slow nitrogen purge was started at this time and maintained throughout the polymerization. The reaction exothermed to 84.8° C. in 4 minutes, cooled back down and maintained at 80.0° C. Two hours after the first initiator addition, 0.0720 g of ammonium persulfate was added and the reaction stirred for another hour. The polymer was removed from the reactor and labeled. It was water-clear with a slightly yellow color and had a 2970 cps Brookfield viscosity.

The preparation of a representative zwitterionic/amphoteric polymer (a 50.3:25.1:24.6:2.5 mole ratio DMAPMAm:MAA:AA:HCl, Ex 37Z/A) utilizing an acrylamide monomer was as follows: D.I. water, 191.4 g, was charged to a 1 liter resin kettle equipped as above. Methacrylic acid, 20.6 g, 16.9 g of acrylic acid and 2.3 g of conc. HCl were added next. The reaction mixture was heated to 55.0° C. and 81.6 g of DMAPMAm added. The reaction mixture exothermed to 70.5° C. and then was heated to 77.0° C. About 20 minutes after the addition of the DMAEMA, 0.7200 g of potassium persulfate, pre-dissolved in 30.0 g of D.I. water, was added and exothermed to purge was started. The reaction exothermed to 82.6° C., cooled back down and was maintained at 77.0° C. for a total polymerization time of two hours. The polymer was removed from the reactor and labeled. It was water-clear with a slightly yellow color and had a 17,680 cps Brookfield viscosity.

The various aqueous polymer solutions were evaluated as water-based adhesives by the following test method to determine the "180° peel adhesion" of the adhesive.

The 180° peel adhesion test was run by coating a 0.63× 5.08×17.78 cm (¼×2×7 inch) piece of wood (pine) with 250 microns of the test adhesive. A 2.54×22.86 cm (1×9 inch) piece of No. 10 "cotton duck" cloth was centered over the adhesive-coated, wood substrate and a 1 Kg roller was pulled back and forth over the cotton duck for 5 cycles. The test panels were allowed to dry for 24 hours in a 22.2° C. (72° F.)/50% relative humidity room. The 180° peel adhesions were determined on a Sintech 1/S using a 5.06 cm (2-inch)/minute jaw speed. All tests were run in triplicate. Scotch NetÔ adhesive was run each time as a control or reference and, on average, gave 10.0N/cm adhesion.

TABLE I

| | Reactants, mol % | | | | | | Properties of Adhesive | | |
| --- | --- | --- | --- | --- | --- | --- | --- | --- | --- |
| | Basic | Acidic Monomer[b.] | | | | | Solids | Viscosity | 180° Peel Adhesion, |
| Ex. | Monomer[a] | AA | MAA | MalA | IA | HCl[c.] | Wt % | cps | Newtons/cm. |
| 1Z | 60 | 40 | | | | 5 | 45 | 9800 | 7.7 |
| 2Z | 55 | 45 | | | | | 37 | 6600 | 10.7 |
| 3Z | 55 | 45 | | | | 2 | 35 | 12060 | 19.1 |
| 4Z | 53 | 47 | | | | 4 | 30 | 54100 | 13.7 |
| 5Z | 53 | 47 | | | | 5 | 37 | 16700 | 9.8 |
| 6Z | 51 | 49 | | | | 2 | 24 | 3600 | 8.9 |
| 7Z | 51 | 49 | | | | | 35 | 20250 | 14.4 |
| 8Z | 51 | 49 | | | | 2 | 35 | 139400 | 18.4 |
| 9A | 60 | | 40 | | | 2 | 35 | 7380 | 13.3 |
| 10A | 60 | | 40 | | | 2 | 40 | 15720 | 7.7 |
| 11A | 55 | | 45 | | | 2 | 30 | 2164 | 6.5 |
| 12A | 55 | | 45 | | | 2 | 35 | 6180 | 17.0 |
| 13A | 55 | | 45 | | | 2 | 40 | 146000 | 18.9 |
| 14A | 51 | | 49 | | | 2 | 30 | 32000 | 13.7 |

TABLE I-continued

| | | | | | | | | |
|---|---|---|---|---|---|---|---|---|
| 15A | 51 | 49 | | | 2 | 35 | 116000 | 22.4 |
| 16A | 45 | 55 | | | | 25 | 4360 | 6.0 |
| 17A | 40 | 60 | | | | 25 | 400000 | 15.6 |
| 18A | 51 | | 49 | | 2 | 45 | 26000 | 6.1 |
| 19A | 51 | | 49 | | 2 | 47.5 | 162000[c.] | 13.3 |
| 20A | 51 | | | 49 | 2 | 50 | 14900 | 7.5 |
| 21A | 51 | | | 49 | 2 | 52.5 | 265000[d.] | 13.1 |

| | Reactants, mol % | | | | | | Properties of Adhesive | | |
|---|---|---|---|---|---|---|---|---|---|
| Ex. | Basic Monomer[a] | AA | MAA | MalA | IA | HCl | Solids Wt % | Viscosity cps | 180° Peel Adhesion, Newtons/cm. |
| 22Z/A | 57.4 | 21.3 | 21.3 | | | 6 | 30 | 1856 | 9.1 |
| 23Z/A | 51 | 24.5 | 24.5 | | | 2 | 30 | 10320 | 19.1 |
| 24Z/A | 51 | 24.5 | 24.5 | | | 2 | 35 | 37800 | 24.7 |
| 25Z/A | 51 | 24.5 | 24.5 | | | 2 | 35 | 51900 | 21.9 |
| 26Z/A | 52.1 | 23.5 | 23.5 | | | 4.7 | 30 | 5240 | 11.6 |
| 27Z/A | 50 | 20 | 30 | | | | 30 | 10280 | 14.0 |
| 28Z/A | 50 | 23.3 | 26.7 | | | | 30 | 10760 | 18.6 |
| 29Z/A | 50 | 30 | 20 | | | | 30 | 11120 | 16.3 |
| 30Z/A | 40.7 | 23.4 | 31.9 | | | 6 | 30 | 385000 | 26.8 |
| 31Z/A | 44.7 | 31.9 | 23.4 | | | 6 | 30 | 126800 | 11.2 |
| 32Z/A | 43.1 | 25 | 31.9 | | | 6 | 25 | 143000 | 22.8 |
| 33Z/A | 42.6 | 28.7 | 28.7 | | | 6 | 30 | 410000 | 22.8 |
| 34Z/A | 50.3 | 24.6 | 25.1 | | | 2.5 | 30[f.] | 106200 | 20.9 |
| 35Z | 53 | 47 | | | | 4 | 40 | 17440 | 6.4 |
| 36A | 51 | | 49 | | | 2 | 25 | 2970 | 5.5 |
| 37Z/A | 50.3 | 24.6 | 25.1 | | | 2.5 | 30 | 17680 | 19.3 |

[a.]The basic monomer in all examples was "DMAEMA," viz., dimethylaminoethyl methacrylate, except in Ex. 35Z, 36A, and 37Z/A the basic monomer was dimethylaminopropyl methacrylamide.
[b.]The abbreviations for the Acidic Monomers mean the following:
"AA" ¾ acrylic acid
"MAA" ¾ methacrylic acid
"MalA" ¾ maleic acid
"IA" ¾ itaconic acid
[c.]The adhesive was actually a blend of 1 part of that of Ex. 18A with 1 part of the same polymer soln. at 50% solids with a viscosity of 186,000 cps.
[d.]The adhesive was actually a blend of 1 part of that of Ex. 20A with 1 part of the same polymer soln. at 55% solids and a viscosity of 400,000+ cps.
[e.]Amount of HCl recited is mol percent based on total mols of monomers charged to polymerization reactor.
[f.]Two portions of the adhesive of Ex. 34Z/A diluted with water to 27.5 and 25% solids had viscosities of 54300 and 29600 cps, respectively, and had 180° peel adhesions of 22.0 and 15.3 Newtons/cm., respectively.

For the zwitterionic adhesives, Ex 1Z through 8Z and 35Z, the higher 180° peel adhesions were obtained with those systems containing 50 to 55% DMAEMA at 35% solids, see Ex. 3/Z, 7/Z and 8/Z. As the basic monomers increased above 55%, the neutralizing agent (HCl), had to be increased to maintain adhesion, see Ex 1Z, 2Z and 3Z. Higher adhesion for these adhesives with higher levels of basic monomers can be obtained by increasing the percent solids of the adhesive as Ex 1Z shows.

Representative amphoteric adhesives are depicted by Ex 9A through 21A and 36A. These polymers provide adhesions similar to their zwitterionic analogs at similar percent solids, as Ex. 12/A and 3Z and 15A and 8Z demonstrate. When maleic acid and itaconic acid were used, high percent solids of the adhesives were required to obtain higher levels of adhesion, see Ex 18A and 19/A and 20A and 21/A.

The combination of the amphoteric functionality and the zwitterionic functionality into the same adhesive polymer to give the zwitterionic/amphoteric polymers (Ex. 22Z/A through 34Z/A and 37Z/A) was most surprising in that better adhesives than either the zwitterionic polymers or the amphoteric by themselves were obtained. This can be seen in Table I where the best amphoteric polymers Ex. 3Z or 8/Z, and the best zwitterionic polymer Ex. 15/A, appear to be inferior to these new zwitterionic/amphoteric polymers Ex. 32Z/A to 34Z/A. The significance of this is that the zwitterionic/amphoteric adhesives "at lower percent solids (polymer)" provide excellent adhesion which is better than the other two. In general, the preferred zwitterionic/amphoteric adhesives, at the same percent solids, are stronger than the best amphoteric polymer and the best zwitterionic polymer. The preferred zwitterionic/amphoteric adhesives have higher bond strengths at much lower viscosities than the zwitterionic polymers, compare Ex 23Z/A with 4Z, and at lower percent solids than the zwitterionic and amphoteric adhesives.

The effect of the percent solids of these adhesive polymers can be seen by comparing polymer Ex 6/Z with Ex 8/Z, Ex 11/A and 12/A with Ex 13/A, Ex 14/A with Ex 15/A, Ex 20/A with Ex 21/A and Ex 23Z/A with Ex 24Z/A and Ex 25Z/A. In general, higher adhesion values are obtained with the higher solids adhesives. The adhesive polymer viscosity also affects adhesion and in general, a higher viscosity yields higher adhesion values. For these zwitterionic, amphoteric and zwitterionic/amphoteric polymers, a preferred adhesive viscosity range would be from about 2000 to 300,000 cps. A more preferred range would be from 5000 to 150,000 cps and a most preferred range would be from 20,000 to 100,000 cps. Again, this would depend on the specific polymer composition and the percent solids of the adhesive.

Various modifications and alterations of this invention will become apparent to those skilled in the art without departing from the scope and spirit of this invention.

What is claimed is:

1. A water-based adhesive consisting essentially of a water-soluble polymer having carboxy groups and quaternary ammonium groups, wherein said polymer is represented by the formula:

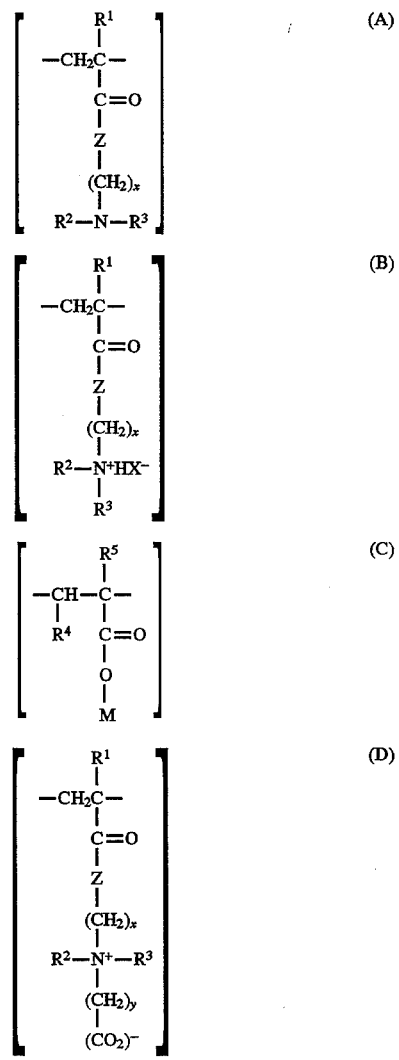

where the bracketed structures A, B, C and D are interpolymerized units randomly repeated and covalently bonded together in polymer chains, units A and C always being present and units B and D independently being present or absent; each $R^1$ is a hydrogen atom or lower alkyl group; $R^2$ and $R^3$ are each independently a $C_1$ to $C_4$ alkyl group; each $R^4$ is independently a hydrogen atom, a methyl group, or COOM; each $R^5$ is independently a hydrogen atom, a lower alkyl group, or $CH_2COOM$, with the proviso that at least one of $R^4$ and $R^5$ is a hydrogen atom; X is the anion of an organic acid or a mineral acid; M is a hydrogen atom or an alkali metal atom; Z is O or NH; and subscripts x and y are independently integers of 1 to 3.

2. The adhesive according to claim 1 where units D are present and $R^4$ and $R^5$ are hydrogen.

3. The adhesive according to claim 1 where units D are absent and one of $R^4$ and $R^5$ is hydrogen.

4. The adhesive according to claim 1 where units D are present and in some units C both $R^4$ and $R^5$ are hydrogen and some other units C one of $R^4$ and $R^5$ is hydrogen.

5. The adhesive according to claim 1, wherein said polymer is represented by the formula:

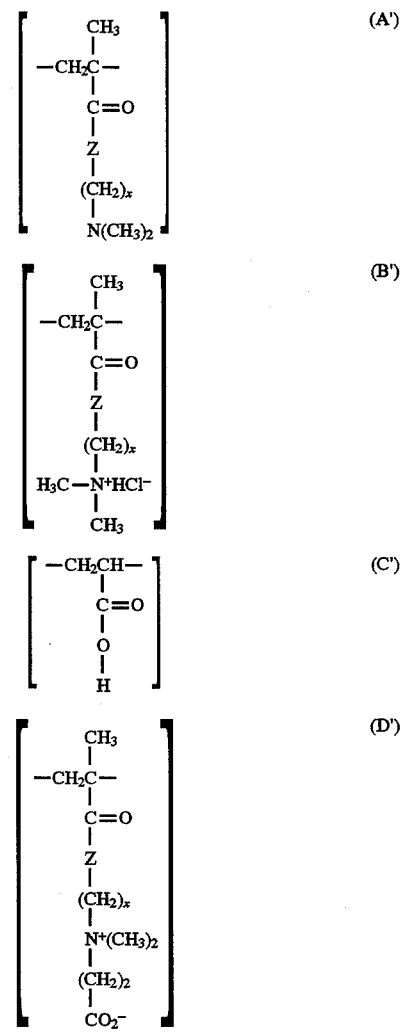

where Z is O or NH and x is an integer of 1 to 3.

6. The adhesive according to claim 5 wherein said polymer is made by polymerizing acrylic acid and one or more dialkylaminoalkyl(meth)acrylamides or dialkylaminoalkyl (meth)acrylates.

7. The adhesive according to claim 5 wherein said polymer is made by polymerizing N,N-dimethylaminoethyl methacrylate and acrylic acid.

8. The adhesive according to claim 5 wherein said polymer is made by polymerizing N,N-dimethylaminopropyl methacrylamide and acrylic acid.

9. The adhesive according to claim 1, wherein said polymer is represented by the formula:

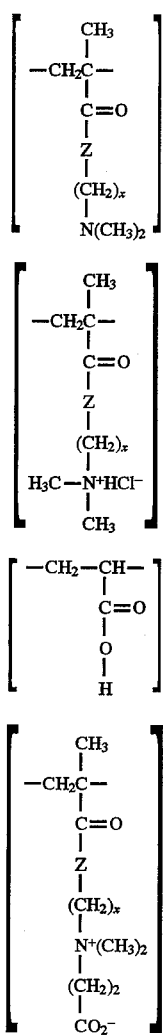 (A''')

(B''')

(C''')

(D''')

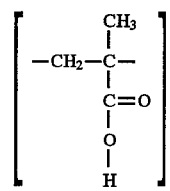 (E''')

where Z is O or NH and x is an integer of 1 to 3.

10. The adhesive according to claim 9 wherein said polymer is made by polymerizing acrylic acid, methacrylic acid, and one or more dialkylaminoalkyl(meth)acrylates or dialkylaminoalkyl(meth)acrylamides.

11. The adhesive according to claim 9 wherein said polymer is made by polymerizing acrylic acid, methacrylic acid, and dimethylaminoethyl methacrylate.

12. The adhesive according to claim 9 wherein said polymer is made by polymerizing acrylic acid, methacrylic acid, and dimethylaminopropyl methacrylamide.

* * * * *